April 27, 1965

T. W. MILLER ETAL 3,180,860

WATER DRY PROCESS FOR NITROCELLULOSE

Filed Aug. 6, 1962

INVENTORS,
Thomas W. Miller
Paul V. Blankenship
BY

S. J. Rotondi, A. J. Dupont & A. D. Akers

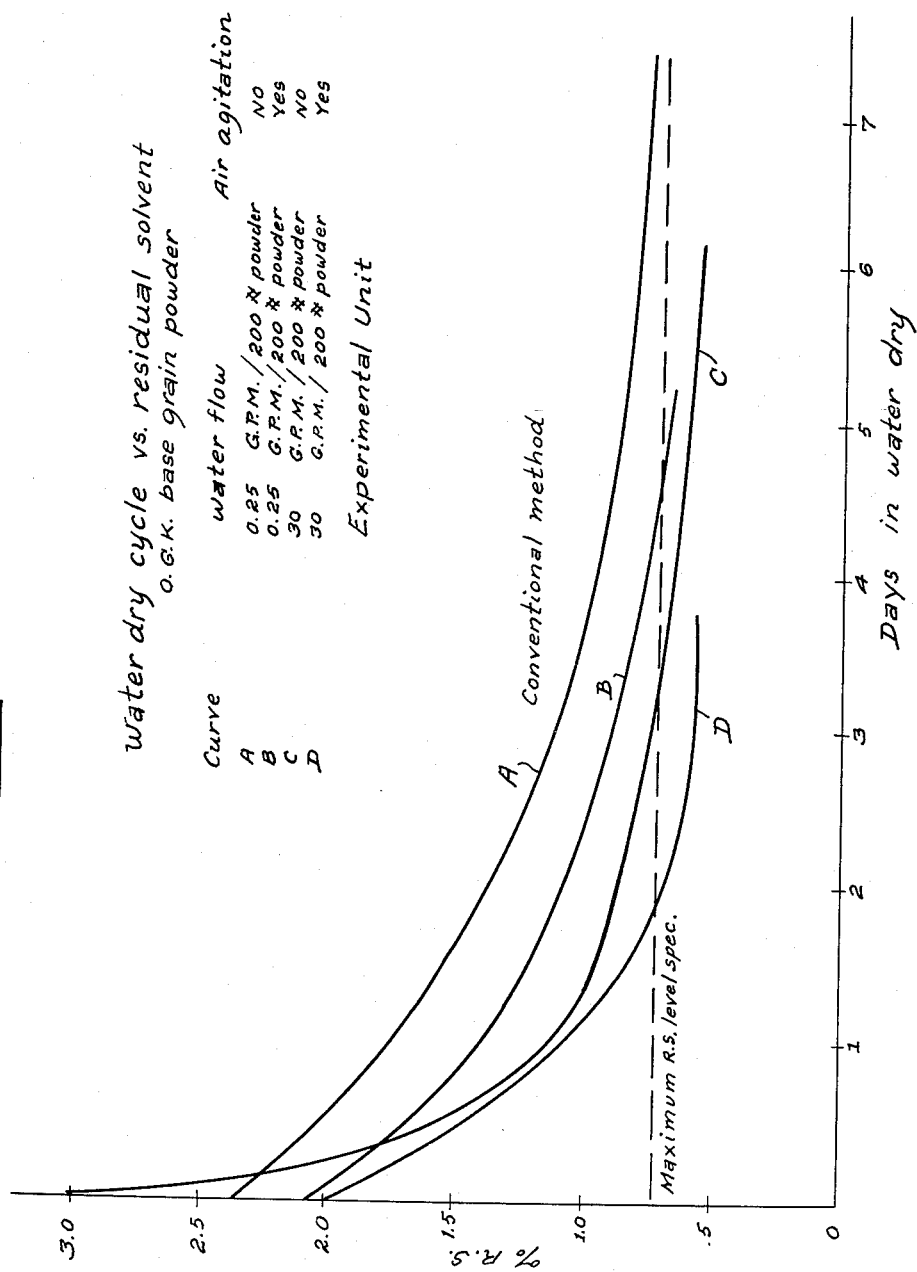

3,180,860
WATER DRY PROCESS FOR NITROCELLULOSE
Thomas W. Miller, Summerville, S.C., and Paul V. Blankenship, Radford, Va., assignors to the United States of America as represented by the Secretary of the Army
Filed Aug. 6, 1962, Ser. No. 215,255
3 Claims. (Cl. 260—223)

This invention relates to the apparatus and process for reducing the water drying time of violently decomposible or explosive organic materials, and particularly for speeding the extraction of residual solvent from single-base smokeless powder by water drying.

The present method of water drying nitrocellulose employs a water circulation rate of 0.25 gallon per minute per 200 pounds of powder at a temperature of 65° C. with no agitation of any type. Water is pumped from a heated surge tank into a circular distributor at the top of the powder tank and is permitted to slowly drain through the powder, causing a steeping action which slowly drives the solvent from the powder. This method required a considerable length of time, generally from 3 to 17 days depending upon the powder formulation and granulation, to reduce the residual solvent to the maximum allowable level, and there was a tendency for water to become saturated with solvents. Thus, the prior process was inherently expensive. The expense arose from the unecessary length of time the powder was "in process," from the greater amount of process equipment required, and from the greater amount of water employed.

The primary object of this invention is to design a process which will reduce the time and expense of the prior water drying process.

Another object of the present invention is to reduce the prior art water dry cycles by 50 to 60 percent with no resulting change in normal physical, chemical, or ballistic characteristics of the powder.

Another object of this invention is to double the prior art water dry production capacity and allow additional water dry units to be placed in standby at present production levels.

An additional object of this invention is to improve the intra-batch uniformity of the powder.

A further object of this invention is to reduce water consumption.

Another object of this invention is to reduce operating costs.

Other and further objects and advantages of this invention will become apparent to those skilled in the art from the following specification and claims taken in connection with the accompanying drawing.

A practical embodiment of the present invention is illustrated in the accompanying drawing, wherein:

FIG. 2 is a graph showing the improvement in the rate of water drying of the present process.

Figure 1:
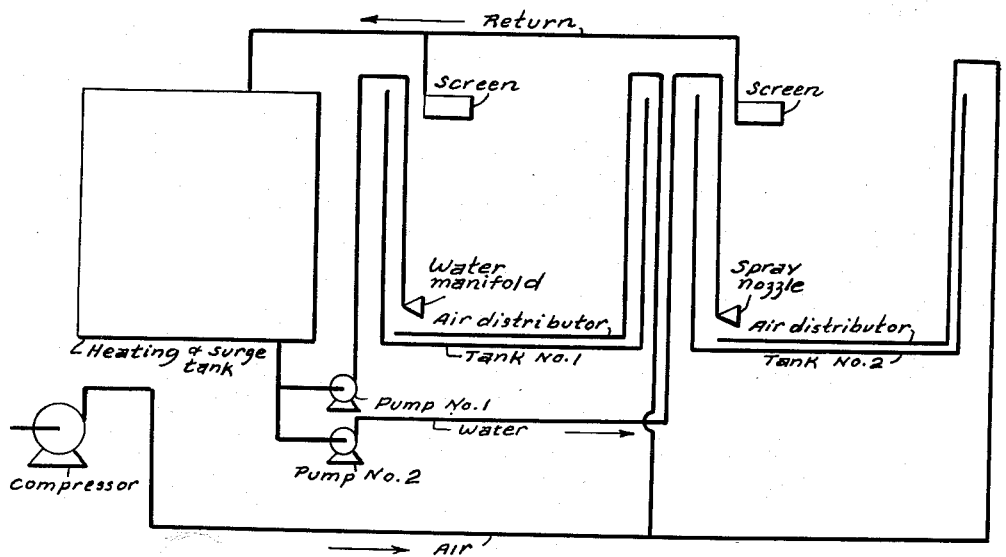
FIG. 1 is a schematic flowsheet of the present process.

Referring to FIG. 1, the present process requires at least two, preferable more, tanks. One of these tanks is employed as a heating and surge tank, and the others are water dry powder tanks. Each of the powder tanks is equipped with an air distributor uniformly arranged near the bottom of the tank. Water manifolds, also located near the bottom of the tank, partially contribute to the agitation of the system by spray discharge of the wash water in three directions, around the periphery of the tank in both directions from the manifold and across the middle of the tank. A box screen is located diametrically opposite the manifold at the desired water level to draw off the water and return it to the heating and surge tank for recycle.

With respect to FIG. 2, curve A represents the normal drying performance of the conventional method. Curve B indicates the effect of air agitation with a small water flow rate, showing that the drying is considerably expedited through the use of air agitation at low water circulation rate. Curve C further bears out the desirability of air agitation by showing that large water flow alone does not give optimum results. Curve D indicates the effect of the use of air agitation with high water circulation rate. This data clearly indicates that the combination of air agitation and a relatively high water circulation rate is best since it effects a reduction in the drying cycle time of more than 65 percent on O.G.K. powder (88% by weight nitrocellulose, 8% by weight 2-nitrodiphenylamine, 5% by weight dioctylphthalate, and 5% by weight lead stearate) over the conventional method for water drying powder.

The primary factor retarding the drying rate in the prior art process appeared to be insufficient contact between the powder and water. It was felt that a higher water flow properly introduced would create sufficient turbulence and agitation to attain the desired result. To test this theory, a trial run was made on O.G.K. powder in an experimental unit in which the water was introduced near the bottom of the tank and discharged near the top. During this run the O.G.K. base grain powder, being of very small physical dimensions, exhibited a tendency to bridge over near the top of the vessel. This resulted in a gradual build-up of the powder in the upper region of the vessel to the extent that it finally overflowed. In order to overcome this problem a small air line was submerged in the vessel through which a small amount of air was permitted to escape into the water-powder admixture. Upon rising to the surface the air broke up the powder bridge thereby preventing the build-up and consequent overflow. Observation of this operation readily suggested the use of air to attain the desired turbulence in conjunction with an increased water flow. The use of air agitation imparted a violent motion to the water which resulted in good washing contact between the powder and water; permitted reduction of the water flow to practical rates; and resulted in uniform temperature distribution throughout the tank, which greatly enhanced the within-batch uniformity of the powder charge. FIG. 2 illustrates the findings and evaluation of this use of air and water under various conditions.

The following example is cited as further illustration of the present invention and is not intended to be limiting in any way.

Two small scale water dry units were constructed from 55 gallon drums. One drum was arranged similarly to a conventional water dry unit being equipped with a circular water distributor located near the top of the vessel and having only a small water circulating capacity. The water outlet was located at the bottom of the tank. The other unit was designed to permit large water circulation through a similar distributor located near the bottom of the vessel, with the effluent point located near the top. This vessel was also equipped with an air agitation sparger located near the bottom. Both vessels were connected to the same circulating system which consisted of a third 55 gallon drum, equipped with an indirect steam heater and water circulating pump. The temperature of the circulating water was automatically controlled at 65° C. Each vessel held approximately 200 pounds of powder and the units could be run simultaneously. The two units were charged with O.G.K. base grain powder taken from a solvent recovery tank, and the drying cycle started. The water flow through the unit of conventional design was maintained at approximately 0.25 gallon per minute.

The circulation rate through the modified unit amounted to approximately 30 gallons per minute. The modified unit was also placed under air agitation sufficient to cause a mild turbulence of the water-powder admixture. Samples were extracted daily from each unit to determine the residual solvent content, and it is apparent that the modified unit appreciably accelerated the drying action, as evidenced by the powder in the modified unit becoming darker in color at a much faster rate than that in the conventional unit. The following table contains this data.

*Comparison between drying time by conventional method and improved method*

| Cycle Period (Days) | O.G.K. Powder—Pilot Units | | | |
|---|---|---|---|---|
| | Improved Design | | Conventional Design | |
| | R.S., Percent | H₂O, Percent | R.S., Percent | H₂O, Percent |
| 0 | Powder Analysis Fresh From Solvent Recovery Tank | | 2.23 | 0.80 |
| 1 | 1.05 | 0.95 | 1.35 | 0.65 |
| | | | 1.88 | 1.10 |
| 2 | 0.68 | 1.10 | 1.87 | 0.70 |
| | 0.69 | 1.20 | 0.65 | 1.05 |
| 3 | 1.33 | 0.50 | 1.71 | 0.30 |
| | 0.29 | 0.85 | 0.53 | 1.15 |
| 4 | 1.20 | 0.73 | 1.06 | 1.38 |
| | 0.57 | 0.55 | 1.21 | 0.75 |
| 5 | 0.74 | 0.98 | | |
| | 0.62 | 0.40 | 0.33 | 0.40 |

Remarks: Normal water dry cycle=eight days.

Certain operational trends became apparent from the several experimental runs conducted. It was found that the reduction of air agitation from 250 c.f.m. (cubic feet/minute) to 50 c.f.m. at the same water circulation rate impeded drying only slightly and an increase in the water circulation rate from 113 g.p.m. (gallons/minute) to 150 g.p.m. gave improvement in the drying time. The operating conditions which were finally determined to be the economic optimum for a material charge of 50,000 pounds of nitrocellulose were an air agitation rate of 50 to 75 c.f.m. and a water circulation rate of 150 to 200 g.p.m.

Although 150 to 200 gallons per minute appears to be a large wasteful quantity of water to employ in this process, it has been found that the water may be used repeatedly when air agitation is used. Repeated tests showed that the pH dropped appreciably when the powder was first put into the water, however, after approximately four hours the pH returned to neutral or slightly above and maintained this condition throughout the remainder of the cycle. It is believed that the constituents causing acidity are flashed off by the air agitation. While aeration of the water apparently removed acid constituents, there was no hazardous release of alcohol vapors above the powder tanks. A mild alcohol odor could be detected above the tanks but no detectable reading was observed on an MSA Explosimeter.

O.G.K. powder containing an ethanol-ether solvent has been employed in the foregoing example and discussion for the purpose of illustrating the behavior of a typical propellant powder formulation. It is obvious that the present process will work equally as well with other single-base propellant formulations, such as, O.I.O. (91% by weight nitrocellulose, 2% by weight 2-nitrodiphenylamine, 3% by weight lead stearate, 4% by weight dimethylphthalate), M-10 (98% by weight nitrocellulose, 1% by weight diphenylamine, and 1% by weight potassium sulfate), and M-6 (87% by weight nitrocellulose, 10% by weight dinitrotoluene, and 3% by weight dibutylphthalate).

We claim:
1. A process for the removal of residual solvent from powdered nitrocellulose comprising placing said powder in a tank of water having a temperature of about 65° C., rapidly circulating a large quantity of water at rate of 150 to 200 gallons per minute through said tank, and bubbling air at rate of 50 to 75 cu. ft. per minute through the water until the powder becomes dark in color.

2. A process for the removal of residual solvent from powdered nitrocellulose comprising washing at approximately 65° C. said powder in a tank having a high rate of 150–200 gallons per minute of water flow therethrough, pumping air at rate of 50–75 cubic feet per minute through a distributor in the bottom of the tank for the dual function of agitating the water powder mixture for more effective solvent removal in a shorter period and reducing the acidity of the water to a point that permits the reuse of the water in subsequent treatments.

3. A process for the removal of residual solvent from powdered nitrocellulose comprising washing at approximately 65° C. said powder for solvent removal in a tank having a high rate of 150–200 gallons per minute of water flow therethrough, pumping air at rate of 50–75 cubic feet per minute through a distributor in the bottom of the tank to agitate the water powder mixture for increased solvent removal in a shorter period of time and utilizing the aeration of the powder mixture for also reducing the acidity of the water to a point permitting the reuse of this increased volume of water for subsequent treatment of such powder mixtures.

References Cited by the Examiner
UNITED STATES PATENTS
1,924,465    8/33    Teeple _____ 149—97 X

OTHER REFERENCES

Military Explosives, Dept. of the Army, Technical Manual TM 9–1910, April 1955, page 131.

CARL D. QUARFORTH, *Primary Examiner.*
LEON D. ROSDOL, REUBEN EPSTEIN, *Examiners.*